Patented Aug. 28, 1945

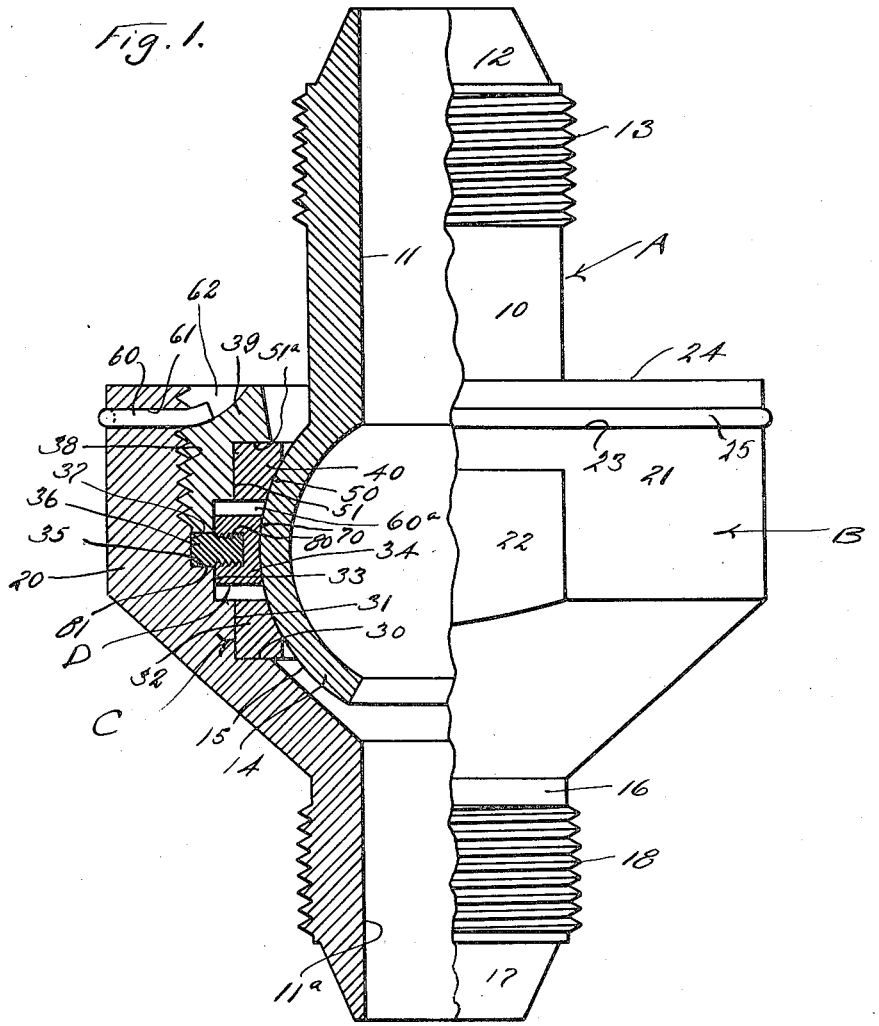

2,383,679

UNITED STATES PATENT OFFICE 2,383,679

FLUID HANDLING COUPLING

Dwight M. Phillips, Fullerton, Calif., assignor to Chiksan Tool Company, Brea, Calif., a corporation of California Application December 27, 1943, Serial No. 515,830

5 Claims. (Cl. 285—95)

This invention has to do with a fluid handling coupling and relates more particularly to that type of coupling wherein the sections are joined by means of a ball and socket construction. It is a general object of the present invention to provide a simple, effective and inexpensive construction of the character mentioned.

Ball and socket joints are used in various situations and to handle fluids of various kinds. In practice such devices present problems of packing and of obtaining effective bearing engagement between the connected parts.

An object of the present invention is to provide a ball and socket type fluid handling coupling including an extremely simple yet effective packing. The present invention provides a single packing unit or ring that can be readily inserted into the construction and which is effective in sealing between the sections both against escape of fluid from the joint and the entrance of foreign matter into the coupling through the joint.

Another object of the invention is to provide an improved and simplified bearing construction for joints of the type mentioned. By the present invention I provide a bearing construction or bearing means which involves two like opposed bearing rings which effectively support the male section and form a chamber or cavity between the sections to accommodate the packing means. The bearing rings provided by the invention are alike and are extremely simple both in formation and construction, making them inexpensive to manufacture and very simple to handle in practice.

The various objects and features of my invention will be fully understood from the following detailed description of a typical preferred form and application of the invention, throughout which description reference is made to the accompanying drawing, in which the single figure is a side view of a joint embodying the construction provided by the present invention with parts broken away at one side to show in section.

The joint provided by my present invention includes, generally, two sections, a male section A and a female section B, bearing means C between the sections supporting the male section within the female section for limited universal movement, and packing means D supported in the female section to effectively seal or pack between the male and female sections A and B.

The male section A of the construction includes a body 10 which, in most cases, will be in the form of an elongate tubular fluid conduit. In the drawing I have shown the body 10 in the form of a tube having a central fluid passage 11. In practice the outer end portion of the body 10 is usually to be connected to a fluid conduit of some kind in which case the outer end portion of the body is provided with means to facilitate connection with such conduit. It is to be understood that, in practice, the connecting means in connection with the body 10 will vary depending upon the situation in which the device is to be used. In the drawing I have shown a tapered seat 12 at the outer end of the body and have shown the body provided with an external screw thread 13 to receive a coupling part.

In accordance with the present invention the inner end portion of the body 10 is provided with an enlargement or head 14, the outer surface 15 of which is spherically curved and is finished to provide a smooth working or bearing surface for cooperation with the bearing means C and packing means D, as will be hereinafter described.

The female section B of the construction includes a body 16 corresponding, generally, to the body 10 of the male section. The bodies 10 and 16 may be alike except that, in practice, it is ordinarily unnecessary to make the body 16 quite as long as the body 10. The body 16 is provided with an opening or fluid passage 11ª corresponding to the passage or opening 11 in the body 10.

The body 16 of the female section, in practice, is provided with coupling means for making connection with a fluid conduit. In the case illustrated the body 16 is shown with the same sort of coupling means as the body 10, that is, it is shown with a bevelled face 17 and an external thread 18 corresponding to the face 12 and the thread 13 of the body 10 of the female section A.

The inner end of the body 16 of the female section carries an enlargement or socket part 20 which receives the head 14 of the male section and which carries the bearing means C and packing means D. In practice the exterior of the socket 20 may vary widely in design and formation. In the case illustrated the outer surface 21 of the socket is round and is concentric with the body 16. This surface is uninterrupted except for diametrically opposite flat parts 22 provided to be engaged by a wrench or other suitable tool. It is also to be observed that the surface 21 of the socket is provided with an annular groove 23 adjacent the outer or mouth end 24 of the socket to accommodate a lock ring 25, as will be hereinafter described.

The interior of the socket 20 of the female section is finished to receive and accommodate the means C and D. In general the interior of the socket is finished so that it presents a transverse shoulder 30 and an axial bore 31 continuing outwardly from the shoulder to carry the inner bearing ring 32. Outward of the bore 31 the socket has an axial bore 33 which supports the inner portion of the packing 34. At the outer end of the bore 33 the socket has a transverse shoulder 35 forming an abutment for the carrier 36 of the packing 34 and projecting outwardly from the shoulder 35 the socket has a bore 37 in which the carrier 36 fits. A threaded bore 38 continues outwardly from the bore 37 to the mouth end 24 of the socket to carry the retainer ring 39 which holds the carrier 36 in place and which carries the outer bearing ring 40.

It is to be noted that the several parts of the opening in the socket 20 of the female section are all concentric and that the bores 31, 33, 37 and 38 are progressively larger as they approach the mouth of the socket so that they are very easily formed and finished.

The bearing means C includes the two bearing rings 32 and 40 above referred to and the retaining ring 39 which threads into the opening 38 in the socket 20 of the female section B. The inner bearing ring 32 fits against the shoulder 30 and within the bore 31 so that it is effectively supported in the socket and it has a spherically curved inner face 50 corresponding in curvature to the outer face 15 of the head on the body of the male section, so that the inner ring 32 and the head 14 fit together as clearly shown in the drawing. The outer bearing ring 40 corresponds in size and shape to the inner bearing ring except that it is arranged in the retainer to be opposed to the inner bearing ring, that is, so that its spherically finished bearing face 50 faces inwardly as clearly shown in the drawing. The outer bearing ring is supported in the retainer 39 so that it can be tightened against the head of the male section by tightening the retainer 39 in the bore 38 of the socket. In the preferred construction the retainer has a bore 51 into which the outer bearing ring fits and has an inwardly facing shoulder 51a engaged by the bearing ring.

The bearing rings 32 and 40 are shaped and proportioned with relation to the head 14 of the male section A so that their spherically curved bearing faces 50, which cooperate with the exterior 15 of the head 14 engage the head 14 to leave a space 60a between them to accommodate the packing means. The retainer 39 of the bearing means threads into the socket 38 and when in proper position is locked by means of a lock pin 60 provided on one end of the ring 25. The pin 60 extends through a radial opening 61 in the socket 20 and enters an opening 62 milled in the retainer 39. The bottom of the milled opening operates to turn the end of part 60, as shown in the drawing. The ring 25 is a split spring ring which is easily arranged in place or removed when it is desired to operate the retainer 39.

With the construction above described the bearing rings 32 and 40 are readily formed separate from the other parts and, in practice, may be advantageously formed of special materials suitable for the use to which the construction is to be put. For instance, for most uses it may be desirable to form the bearing rings of a self-lubricating material such as a bearing material impregnated with oil or graphite, thus providing a construction which does not require lubrication.

The packing ring 34 is a continuous annular body of rubber or rubber-like material such as a synthetic rubber, and is shaped in proportion so that when it is in place its inner face or surface 70 bears on the exterior 15 of the head 14. The carrier 36 for the packing ring may be a metal ring, the inner portion 80 of which is roughened so that the packing ring can be advantageously formed on or applied to it. The outer portion of the carrier projects radially beyond the packing ring to fit into the bore 37 and to be held on the seat or shoulder 35 by the retainer 39. The inner end 81 of the retainer 39 directly engages the carrier to hold it tight on the shoulder 35.

With the construction just described the packing ring 34 and its carrier 36 may be formed and handled as a unit. This unit is simple and inexpensive and is very easy to insert or arrange in place within the socket and can be readily removed or renewed whenever desired by simply removing the retainer 39.

In practice the packing ring 34 may be proportioned so that it does not completely occupy the space 60a but leaves an opening at either side of the ring which may, if desired, be packed with a lubricant. If a synthetic rubber is used in the packing ring or if a material is used that is not attacked by oil or grease, oil or grease may be applied to the openings at either side of the packing ring when the construction is assembled.

From the foregoing description it will be apparent that I have provided a joint construction that is extremely simple and inexpensive of manufacture. Parts are all simple in form and such that they can be easily and economically manufactured. Further, it is to be observed that the construction is very simple to assemble or to disassemble, and that it is a very simple operation to remove and replace either of the bearing rings or the packing unit.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A fluid handling coupling including, a male section having a spherically curved head, a female section receiving the head, a packing unit carried by the female section engaging the head, and bearing means supporting the head in the female section and including bearing rings arranged at opposite sides of the packing unit and spaced therefrom establishing lubricant chambers at each side of the packing unit.

2. A fluid handling coupling including, a male section having a spherically curved head, a female section receiving the head, a packing unit carried by the female section engaging the head, and bearing means supporting the head in the female section and including bearing rings arranged at opposite sides of the packing unit, the packing unit including, a ring of rubber-like material engaging the head to seal therewith and a metal carrier for the rubber-like ring held fast in the female section.

3. A fluid handling coupling including, a male section having a spherically curved head, a female section receiving the head, a packing unit carried by the female section engaging the head, and bearing means supporting the head in the female section and including an inner bearing ring seated in the female section and engaging the exterior of the head, a single retainer detachable from the female section, and an outer ring carried by the retainer so it is supported both radially and axially and so it engages the exterior of the head, the rings being spaced apart and the packing unit being spaced from both rings establishing lubricant chambers at each side of the packing unit.

4. A fluid handling coupling including, a male section having a spherically curved head, a shouldered female section receiving the head, a packing unit carried by the female section engaging the head, and bearing means supporting the head in the female section and including an inner bearing ring seated in the female section and engaging the exterior of the head, a shouldered retainer detachable from the female section, and an outer bearing ring carried by the retainer engaging the shoulder thereof and engaging the exterior of the head, the rings being spaced apart axially of the coupling and the packing unit being arranged between the rings, the packing unit including, a ring of rubber-like material engaging the head and a metal carrier for the rubber-like ring clamped between the retainer and the shoulder of the female section.

5. A fluid handling coupling including, a male section having a spherically curved head, a female section receiving the head, a packing unit carried and within the female section and engaging the head, and bearing means supporting the head in the female section and including an inner bearing ring seated in the female section and engaging the exterior of the head, a single retainer detachable from the female section, and an outer ring carried by the retainer and engaging the exterior of the head, the retainer engaging the packing unit to hold it in place in the female section.

DWIGHT M. PHILLIPS.